US006887527B2

(12) United States Patent
Matsumura

(10) Patent No.: US 6,887,527 B2
(45) Date of Patent: May 3, 2005

(54) PREPARATION OF MODIFIED WOOD

(75) Inventor: Kazuyuki Matsumura, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 3 days.

(21) Appl. No.: 10/669,268

(22) Filed: Sep. 25, 2003

(65) Prior Publication Data

US 2004/0062872 A1 Apr. 1, 2004

(30) Foreign Application Priority Data

Sep. 26, 2002 (JP) ....................................... 2002-280908

(51) Int. Cl.[7] ............................ B05D 1/36; B05D 1/38; B32B 21/04; B32B 21/08; B32B 21/14

(52) U.S. Cl. ....................... 427/408; 428/447; 428/452; 428/537.1

(58) Field of Search .............................. 528/10, 12, 33, 528/34, 35, 38; 524/858, 860, 863, 864, 869; 106/14.05, 287.1, 287.11, 287.12, 287.13, 287.16; 427/402, 407.1, 408; 428/446, 447, 452, 537.1

(56) References Cited

U.S. PATENT DOCUMENTS 4,661,551 A 4/1987 Mayer et al.
5,652,026 A 7/1997 Saka et al.
5,985,372 A 11/1999 Saka et al.
6,077,966 A * 6/2000 Matsumura et al. ........ 556/425
6,294,608 B1 * 9/2001 Hager et al. ................ 524/838
2003/0139481 A1 * 7/2003 Osawa ........................ 516/53

FOREIGN PATENT DOCUMENTS

| | | | |
|---|---|---|---|
| JP | 55-133466 | A | 10/1980 |
| JP | 55-133467 | A | 10/1980 |
| JP | 61-162553 | A | 7/1986 |
| JP | 1-292089 | A | 11/1989 |
| JP | 4-249588 | A | 9/1992 |
| JP | 5-156164 | A | 6/1993 |
| JP | 5-221748 | A | 8/1993 |
| JP | 7-39494 | B2 | 5/1995 |
| JP | 7-150131 | A | 6/1995 |
| JP | 8-199066 | A | 8/1996 |
| JP | 9-77780 | A | 3/1997 |
| JP | 10-81752 | A | 3/1998 |
| JP | 2000-95868 | A | 4/2000 |

* cited by examiner

*Primary Examiner*—Michael J. Feely
(74) *Attorney, Agent, or Firm*—Birch, Stewart, Kolasch & Birch, LLP

(57) ABSTRACT

Wood is modified by treating with an aqueous water repellent [I] and an emulsion water repellent [II]. The aqueous water repellent [I] comprises a product obtained through co-hydrolytic condensation of (A) an organosilicon compound: $(R^1)_a(OR^2)_bSiO_{(4-a-b)/2}$ and (B) an amino-containing alkoxysilane: $R^3R^4NR^5—SiR^6{}_n(OR^2)_{3-n}$. The emulsion water repellent [II] is a trialkylsiloxysilicate emulsion water repellent obtained by polymerizing (C) an organodisiloxane: $R^7{}_3Si—O—SiR^7{}_3$ and (D) a tetraalkoxysilane: $Si(OR^7)_4$ in an aqueous solution containing (E) a surfactant and (F) water. Two stages of treatment with repellents [I] and [II] can impart water repellency, minimal water absorption and dimensional stability to wood.

13 Claims, 2 Drawing Sheets

PREPARATION OF MODIFIED WOOD

TECHNICAL FIELD

This invention relates to a method for preparing modified wood having high water repellency, minimum water absorption and high dimensional stability.

BACKGROUND ART

In the prior art, many methods are known for imparting dimensional stability and water repellency to wood and building materials such as wood. Typically, materials are coated or impregnated with solutions of silicone, acrylic, urethane, ester, fatty and oily resins or monomers, followed by drying. Of these repellents, silicone repellents are widespread. In particular, silicone water repellents of the solvent dilution type become the main stream.

However, water repellents of the solvent dilution type generally have a more negative influence of the solvent on the environment than the water dilution type. Also from the standpoints of environmental protection and resource preservation, there is a strong desire to have water repellents which do not use solvents, especially aqueous water repellents of high performance.

While many aqueous water repellents were recently developed, JP-A 1-292089, JP-A 5-156164 and JP-A 5-221748 disclose long term stable emulsions having alkyltrialkoxysilanes emulsified in water. However, these emulsions have several drawbacks since they use alkoxysilanes characterized by very slow hydrolytic reaction. When the emulsion is applied to a material, the material is effectively impregnated therewith, but the silane volatilizes off from the material surface. As a result, the material surface loses water repellency, becomes vulnerable to water wetting, staining and popup by frosting and thus undesirably less durable, and looks milky white on outer appearance.

JP-A 8-199066 and JP-B 7-39494 disclose methods for preparing emulsion-base water repellents of trialkylsiloxysilicates capable of imparting high water repellency. These repellents are expensive because trialkylalkoxysilanes or trialkylsilanols are used as the starting material. The preparation methods are complex and uneconomical. When an alkoxysilane is polymerized in an aqueous emulsifier solution at a temperature below 15° C., a uniform emulsion is not obtainable. The resulting trialkylsiloxysilicate-base emulsion water repellent is unsatisfactory.

Aside from the emulsion type mentioned above, JP-A 61-162553, JP-A 4-249588 and JP-A 10-81752 disclose water repellents of homogeneous aqueous solution type.

However, the composition of JP-A 61-162553 lacks storage stability in that rapid polymerization reaction takes place upon dilution with water. The composition must be used within a day after dilution and is thus impractical. The rapid polymerization reaction leads to a molecular weight buildup, which retards impregnation of the material therewith, sometimes leaving wet marks on the material surface.

The composition of JP-A 4-249588 comprising a water-soluble amino group-containing coupling agent and an alkyltrialkoxysilane having a short carbon chain has good storage stability, but poor water repellency probably because only the lower alkyl group contributes to water repellency. Since the amino group-containing coupling agent component is included in excess of the alkylalkoxysilane component as demonstrated by a molar ratio of alkylalkoxysilane component/amino group-containing coupling agent in the range from 0.5/10 to 3/1, there are problems that wet color marks are left on the material surface and paper, fibrous items and wood are substantially yellowed.

JP-A 2000-95868 discloses a method for preparing a composition by first partially hydrolyzing an alkyltrialkoxysilane or alkyldialkoxysilane having a short carbon chain and an amino group-containing alkoxysilane, adding hydrolytic water and an acid to effect further hydrolysis, and finally adding a neutralizing agent. This method is complex. In the first step of effecting hydrolytic reaction on a mixture of the alkylalkoxysilane and the amino group-containing alkoxysilane, the amino group-containing alkoxysilane generally has a higher hydrolytic rate than the alkylalkoxysilane, which becomes a bar against co-hydrolysis, failing to effectively form a co-hydrolytic product. The composition finally obtained by this method is thus unsatisfactory. Treatment of neutral substrates with the composition undesirably imparts poor water repellency.

JP-A 7-150131 discloses the treatment of wood with a composition comprising a salt of an organic or inorganic acid with a basic nitrogen-containing organopolysiloxane, a water repellent substance and water. This composition, however, has the problems of insufficient water repellency and storage instability.

JP-A 55-133466 and JP-A 55-133467 disclose a composition obtained by hydrolyzing an alkylalkoxysilane, an amino group-containing alkoxysilane, an epoxy group-containing alkoxysilane and a metal-metalloid salt with water. The treatment of substrates with the composition minimizes yellowing. However, since amino groups are blocked by the reaction of amino groups with epoxy groups, the composition becomes so difficultly soluble in water that it cannot be used as an aqueous treating agent. The amino blocking also restrains the adsorption of the composition to substrates so that the composition cannot be used for the treatment of substrates.

To solve the above problems, we proposed in JP-A 9-77780 a composition comprising the co-hydrolyzate of an alkylalkoxysilane having 7 to 18 carbon atoms, an alkoxy group-containing siloxane and an amino group-containing alkoxysilane. Despite the use of long chain alkyl silane, the composition provides substrates with weak water repellency. When paper, fibrous items and wood are treated with the composition, somewhat noticeable yellowing occurs.

Proposed in JP-A 10-081752 is a binder composition which is stable in an alkaline region. Due to a substantial amount of amino group-containing alkoxysilane used therein, this composition had many problems including insufficient water repellency as an agent for treating non-alkaline substrates, wet color left on the treated material, and substantial yellowing.

Accordingly, all the water repellents described above are seldom regarded as performing satisfactorily for the treatment of wood substrates originating from lignocellulose materials.

On the other hand, housing members available at present include plywood members which are often used as bearing wall members, structural floor sheathing members, and roof sheathing members, and veneer laminates which are often used as two-by-four members and Japanese traditional wooden framework members.

It has heretofore been possible to produce plywood and veneer laminates from a useful wood raw material having excellent properties which is selected for a particular purpose or application from among wood raw materials having relatively good properties, for example, south sea timber.

Due to the depletion of wood resources, it is not always possible under the currently prevailing circumstances to use only a wood raw material having excellent properties. Now that the regulation of insuring and promoting the quality of houses and buildings has been enforced, the quality demand to housing members is and will be increasing. It is forecasted that the future need is to produce plywood or veneer laminates which are less expensive, have good physical properties and impose a less load to the environment upon discarding.

These facts suggest that with the progress of depletion of wood resources, the preparation of wooden panels from a wood material having excellent properties as the raw material is not always possible. In particular, plywood and veneer laminate products from a typical forested tree, Radiate pine (Pinus Radiata D. DON) as the raw material have not been widespread because of problems including dimensional changes, warping and mildewing due to their high water and moisture absorptive properties.

One conventional approach used to solve these problems is to apply emulsions of acrylic water repellents or paraffinic water repellents. However, a blocking problem often occurs when these water repellents are applied to plies and dried and the plies are piled up. This problem precludes widespread use in practical applications.

SUMMARY OF THE INVENTION

An object of the invention is to provide a method for preparing modified wood using an aqueous water repellent which is improved in impregnation of wood therewith and imparts dimensional stability and water repellency to wood.

Another object of the invention is to provide a method for preparing modified plywood or modified veneer laminates, which method can render plywood or veneer laminates termite-proof, rot-proof, mildew-proof, water resistant, moisture resistant and dimensional stable and thus accomplish the desired performance without detracting from the lightweight advantage thereof.

We have discovered that when wood is treated with an aqueous water repellent [I] and with an emulsion water repellent [II], both defined below, surprisingly, the wood is so modified that it is endowed with very high water repellency and high water absorption inhibition and thus improved in dimensional stability. Specifically, by first treating wood with the cationic aqueous water repellent [I], the wood is rendered fully water repellent to the deep interior. When the wood is subsequently treated with the trialkylsiloxysilicate-based anionic emulsion water repellent [II], trialkylsiloxysilicate particles strongly adsorb to the cationic surface, enabling to maintain high water repellency over a long period. Both the interior and the external surface of wood are thus rendered strongly water repellent, imparting high dimensional stability. The strong water repellency restrains leaching of termite-proof and anti-bacterial ingredients, if any, so that such properties can be maintained over a long period.

The present invention provides a method for preparing modified wood comprising treating wood with an aqueous water repellent [I] and treating the same with an emulsion water repellent [II]. The aqueous water repellent [I] comprises a product obtained through co-hydrolytic condensation of (A) 100 parts by weight of an organosilicon compound of the general formula (1):

$$(R^1)_a(OR^2)_bSiO_{(4-a-b)/2} \quad (1)$$

wherein $R^1$ is a $C_{1-6}$ alkyl group, $R^2$ is a $C_{1-4}$ alkyl group, a is a positive number of 0.75 to 1.5, b is a positive number of 0.2 to 3, satisfying $0.9<a+b\leqq 4$, and (B) 0.5 to 49 parts by weight of an amino-containing alkoxysilane of the general formula (2):

$$R^3R^4NR^5—SiR^6_n(OR^2)_{3-n} \quad (2)$$

wherein $R^2$ is as defined above, $R^3$ and $R^4$ are each independently hydrogen or a $C_{1-15}$ alkyl or aminoalkyl group, $R^5$ is a divalent $C_{1-18}$ hydrocarbon group, $R^6$ is a $C_{1-4}$ alkyl group, and n is 0 or 1, or a partial hydrolyzate thereof, in the presence of an organic acid or inorganic acid.

The emulsion water repellent [II] is a trialkylsiloxysilicate emulsion water repellent obtained by polymerizing (C) an organodisiloxane of the general formula (3):

$$R^7_3Si—O—SiR^7_3 \quad (3)$$

wherein $R^7$ is each independently a $C_{1-10}$ alkyl group, and (D) at least one of a tetraalkoxysilane of the general formula (4):

$$Si(OR^7)_4 \quad (4)$$

wherein $R^7$ is each independently a $C_{1-10}$ alkyl group, and a partial hydrolyzate thereof, in such a proportion that the molar ratio of trialkylsiloxy units: $R^7_3SiO_{0.5}$ in component (C) to tetrafunctional units: $SiO_{4/2}$ in component (D) may fall in a range of 0.5 to 2.0, in an aqueous solution containing (E) a surfactant and (F) water at a temperature of 30 to 90° C.

BEST MODE FOR CARRYING OUT THE INVENTION

Figure 1:
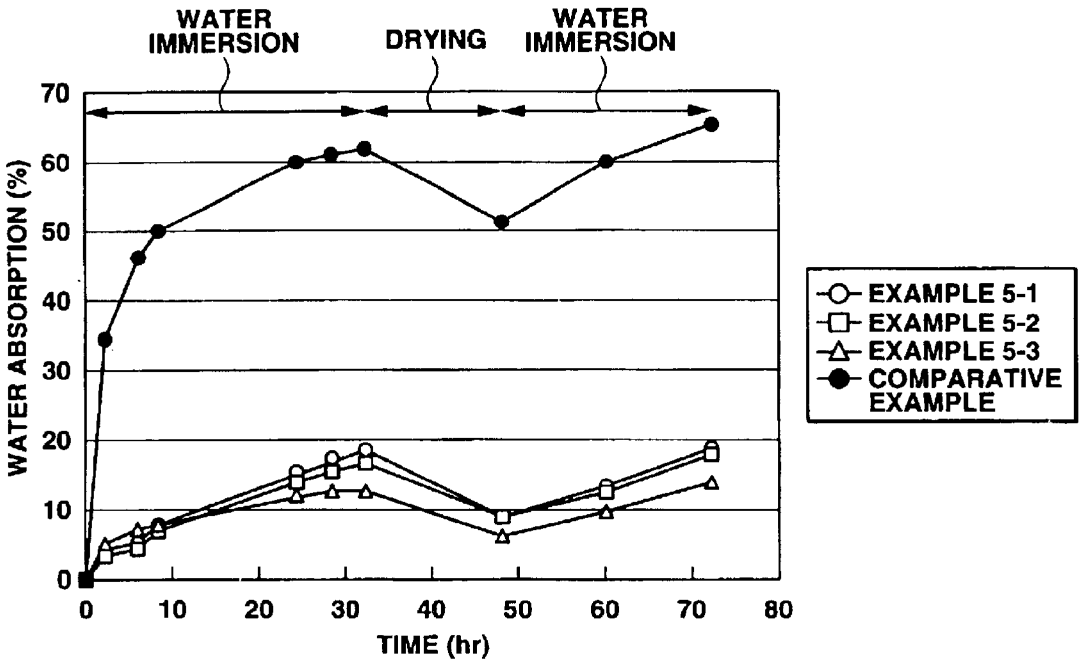
FIG. 1 is a graph showing changes with time of percent water absorption of samples in Example 5.

First the aqueous water repellent [I] used in the modification of wood according to the inventive method is described. Component (A) used to produce the aqueous water repellent [I] is an organosilicon compound having the following general formula (1).

$$(R^1)_a(OR^2)_bSiO_{(4-a-b)/2} \quad (1)$$

Herein $R^1$ is an alkyl group having 1 to 6 carbon atoms, $R^2$ is an alkyl group having 1 to 4 carbon atoms, letter a is a positive number of 0.75 to 1.5, b is a positive number of 0.2 to 3 and a+b is from more than 0.9 to 4.

More particularly, in formula (1), $R^1$ is an alkyl group having 1 to 6 carbon atoms, preferably 1 to 3 carbon atoms. Examples include methyl, ethyl, n-propyl, isopropyl, n-butyl, isobutyl, n-pentyl and n-hexyl, with methyl being preferred.

$R^2$ is an alkyl group having 1 to 4 carbon atoms, for example, methyl, ethyl, n-propyl, isopropyl, n-butyl and isobutyl, with methyl and ethyl being preferred.

Illustrative examples of the organosilicon compound of formula (1) are given below.

| | |
|---|---|
| $CH_3Si(OCH_3)_3$, | $CH_3Si(OC_2H_5)_3$, |
| $CH_3Si(OCH(CH_3)_2)_3$, | $CH_3CH_2Si(OCH_3)_3$, |
| $CH_3CH_2Si(OC_2H_5)_3$, | $CH_3CH_2Si(OCH(CH_3)_2)_3$, |
| $C_3H_6Si(OCH_3)_3$, | $C_3H_6Si(OC_2H_5)_3$, |
| $C_3H_6Si(OCH(CH_3)_2)_3$, | $C_4H_9Si(OCH_3)_3$, |
| $C_4H_9Si(OC_2H_5)_3$, | $C_4H_9Si(OCH(CH_3)_2)_3$, |
| $C_5H_{11}Si(OCH_3)_3$, | $C_5H_{11}Si(OC_2H_5)_3$, |
| $C_5H_{11}Si(OCH(CH_3)_2)_3$, | $C_6H_{13}Si(OCH_3)_3$, |
| $C_6H_{13}Si(OC_2H_5)_3$, | $C_6H_{13}Si(OCH(CH_3)_2)_3$ |

These silanes may be used alone or in admixture of any. Partial hydrolyzates of mixed silanes are also useful.

Herein, alkoxy group-containing siloxanes resulting from partial hydrolytic condensation of the above silanes are preferably used as component (A). The partial hydrolyzates (siloxane oligomers) preferably have 2 to 10 silicon atoms, especially 2 to 4 silicon atoms. The reaction products of alkyltrichlorosilanes having 1 to 6 carbon atoms with methanol or ethanol in water may also be used as component (A). In this case too, the siloxane oligomers preferably have 2 to 6 silicon atoms, especially 2 to 4 silicon atoms. Of these siloxane oligomers, siloxane dimers of the formula $[CH_3(OR^2)_2Si]_2O$ are especially preferred. They may contain siloxane trimers and siloxane tetramers. The preferred siloxane oligomers are those having a viscosity of up to 300 $mm^2/s$ at 25° C., especially 1 to 100 $mm^2/s$ at 25° C.

Component (B) is an amino group-containing alkoxysilane having the following general formula (2) or a partial hydrolyzate thereof.

$$R^3R^4NR^5—SiR^6_n(OR^2)_{3-n} \quad (2)$$

Herein $R^2$ is as defined above, $R^3$ and $R^4$, which may be the same or different, are independently hydrogen or an alkyl or aminoalkyl group having 1 to 15 carbon atoms, preferably 1 to 8 carbon atoms, more preferably 1 to 4 carbon atoms, $R^5$ is a divalent hydrocarbon group having 1 to 18 carbon atoms, preferably 1 to 8 carbon atoms, more preferably 3 carbon atoms, $R^6$ is an alkyl group having 1 to 4 carbon atoms, and n is 0 or 1.

In formula (2), examples of $R^3$ and $R^4$ include methyl, ethyl, propyl, butyl, aminomethyl, aminoethyl, aminopropyl and aminobutyl. Examples of $R^5$ include alkylene groups such as methylene, ethylene, propylene and butylene. Exemplary of $R^6$ are methyl, ethyl, propyl and butyl.

Illustrative examples of the amino group-containing alkoxysilane of formula (2) are given below.

| | |
|---|---|
| $H_2N(CH_2)_2Si(OCH_3)_3$, | $H_2N(CH_2)_2Si(OCH_2CH_3)_3$, |
| $H_2N(CH_2)_3Si(OCH_3)_3$, | $H_2N(CH_2)_3Si(OCH_2CH_3)_3$, |
| $CH_3NH(CH_2)_3Si(OCH_3)_3$, | $CH_3NH(CH_2)_3Si(OCH_2CH_3)_3$, |
| $CH_3NH(CH_2)_5Si(OCH_3)_3$, | $CH_3NH(CH_2)_5Si(OCH_2CH_3)_3$, |
| $H_2N(CH_2)_2NH(CH_2)_3Si(OCH_3)_3$, | |
| $H_2N(CH_2)_2NH(CH_2)_3Si(OCH_2CH_3)_3$, | |
| $CH_3NH(CH_2)_2NH(CH_2)_3Si(OCH_3)_3$, | |
| $CH_3NH(CH_2)_2NH(CH_2)_3Si(OCH_2CH_3)_3$, | |
| $C_4H_9NH(CH_2)_2NH(CH_2)_3Si(OCH_3)_3$, | |
| $C_4H_9NH(CH_2)_2NH(CH_2)_3Si(OCH_2CH_3)_3$, | |
| $H_2N(CH_2)_2SiCH_3(OCH_3)_2$, | |
| $H_2N(CH_2)_2SiCH_3(OCH_2CH_3)_2$, | |
| $H_2N(CH_2)_3SiCH_3(OCH_3)_2$, | |
| $H_2N(CH_2)_3SiCH_3(OCH_2CH_3)_2$, | |
| $CH_3NH(CH_2)_3SiCH_3(OCH_3)_2$, | |
| $CH_3NH(CH_2)_3SiCH_3(OCH_2CH_3)_2$, | |

-continued

| |
|---|
| $CH_3NH(CH_2)_5SiCH_3(OCH_3)_2$, |
| $CH_3NH(CH_2)_5SiCH_3(OCH_2CH_3)_2$, |
| $H_2N(CH_2)_2NH(CH_2)_3SiCH_3(OCH_3)_2$, |
| $H_2N(CH_2)_2NH(CH_2)_3SiCH_3(OCH_2CH_3)_2$, |
| $CH_3NH(CH_2)_2NH(CH_2)_3SiCH_3(OCH_3)_2$, |
| $CH_3NH(CH_2)_2NH(CH_2)_3SiCH_3(OCH_2CH_3)_2$, |
| $C_4H_9NH(CH_2)_2NH(CH_2)_3SiCH_3(OCH_3)_2$, |
| $C_4H_9NH(CH_2)_2NH(CH_2)_3SiCH_3(OCH_2CH_3)_2$ |

Of these, preferred are N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, N-(2-aminoethyl)-3-aminopropylmhetyldiethoxysilane, 3-aminopropyltrimethoxysilane, 3-aminopropylmethyldimethoxysilane, 3-aminopropyltriethoxysilane, and 3-aminopropylmethyldiethoxysilane.

With respect to the mixing proportion of components (A) and (B), 0.5 to 49 parts, preferably 5 to 30 parts by weight of component (B) is used per 100 parts by weight of component (A) (all parts being by weight, hereinafter). With less than 0.5 part of component (B), the product becomes less water soluble and unstable in aqueous solution form. The product using more than 49 parts of component (B) may become poor in water repellency and long-term inhibition of water absorption and cause considerable yellowing when wood is treated therewith.

Stated on a molar basis, components (A) and (B) are used such that 0.01 to 0.3 mol, especially 0.05 to 0.2 mol of Si atoms in component (B) are available per mol of Si atoms in component (A).

In preparing the aqueous water repellent using components (A) and (B), co-hydrolysis is carried out on components (A) and (B) in the presence of an organic acid or inorganic acid.

In a preferred embodiment, the co-hydrolytic condensation product is obtained by first hydrolyzing component (A) in the presence of an organic acid or inorganic acid, mixing the resulting hydrolyzate with component (B), and effecting further hydrolysis in the presence of an organic acid or inorganic acid.

The organic acid or inorganic acid used for the first hydrolysis of component (A) is at least one acid selected from among hydrochloric acid, sulfuric acid, methanesulfonic acid, formic acid, acetic acid, propionic acid, citric acid, oxalic acid and maleic acid. Of these, acetic acid and propionic acid are preferred. The acid is preferably used in an amount of 2 to 40 parts, more preferably 3 to 15 parts per 100 parts of component (A).

Hydrolysis is preferably carried out in a state diluted moderately with a solvent. The solvent is preferably selected from alcoholic solvents, especially methanol, ethanol, isopropyl alcohol and tert-butyl alcohol. An appropriate amount of the solvent used is 50 to 300 parts, more preferably 70 to 200 parts per 100 parts of component (A). With less than 50 parts of the solvent, excessive condensation may take place. With more than 300 parts of the solvent, hydrolysis may take a longer time.

The amount of water added to component (A) for hydrolysis is preferably 0.5 to 4 mol, especially 1 to 3 mol per mol of component (A). If the amount of water added is less than 0.5 mol, there may be left more alkoxy groups. With more than 4 mol of water, condensation may take place to an excessive extent. Preferred reaction conditions for hydrolysis of component (A) include a reaction temperature of 10 to 40° C., especially 20 to 30° C. and a reaction time of 1 to 3 hours.

The hydrolyzate of component (A) thus obtained is then reacted with component (B). Preferred reaction conditions of this step include a reaction temperature of 60 to 100° C. and a reaction time of 1 to 3 hours. At the end of reaction, the reaction system is heated above the boiling point of the solvent for distilling off the alcohol solvent. Preferably the alcohol solvent is distilled off until the content of entire alcohols (including the alcohol as reaction medium and the alcohol as by-product) in the system becomes 30% by weight or less, especially 10% by weight or less. If the product contains much alcohol, it may become white turbid or gel when diluted with water, and lose storage stability. The reaction product obtained by the above-described method should preferably have a viscosity of 5 to 2,000 $mm^2/s$ at 25° C., especially 50 to 500 $mm^2/s$ at 25° C. Too high a viscosity may adversely affect ease of working and storage stability and reduce the solubility in water. The product preferably has a weight average molecular weight in the range of 500 to 5,000, especially 800 to 2,000.

The aqueous water repellent of the invention is comprised of the co-hydrolytic condensation reaction product of components (A) and (B) obtained by the above-described method. Presumably because the product is present dissolved or in micelle state in an aqueous solution due to compliant orientation of hydrophilic moieties (amino and silanol groups) and hydrophobic moieties (alkylsilyl groups), the product develops water solubility despite the low content of component (B). The product exhibits good water repellency regardless of the long chain alkylsilane component being eliminated, good penetrability, and durable water repellency presumably because of orientation with respect to the wood. When the repellent is diluted with water, polymerization reaction in water is restrained, and storage stability is improved.

In a preferred embodiment, (G) an aliphatic quaternary ammonium compound and/or (H) a boron-containing compound is added to the aqueous water repellent according to the invention.

Preferably the aliphatic quaternary ammonium compound (G) is a quaternary amino group-containing alkoxysilane having the following general formula (5) or a partial hydrolyzate thereof.

$$[(CH_3)_2R^7N(CH_2)_3—SiR^6_n(OR^2)_{3-n}]^+X^- \quad (5)$$

Herein $R^2$ and $R^6$ are as defined above, $R^7$ is a monovalent hydrocarbon group having 11 to 22 carbon atoms, especially alkyl or alkenyl, and n is 0 or 1. This is a component that imparts antibacterial and antifungal properties to wood when wood is treated with the aqueous water repellent.

In formula (5), exemplary of $R^7$ are $—C_{11}H_{23}$, $—C_{12}H_{25}$, $—C_{16}H_{31}$, $—C_{16}H_{33}$, $—C_{18}H_{37}$, $—C_{20}H_{41}$, and $—C_{22}H_{45}$ groups.

Illustrative and preferred examples of the quaternary amino group-containing alkoxysilane having formula (5) include $[C_{12}H_{25}(CH_3)_2N(CH_2)_3Si(OCH_3)_3]^+Cl^-$, $[C_{14}H_{29}(CH_3)_2N(CH_2)_3Si(OCH_2CH_3)_3]^+Cl^-$, $[C_{16}H_{33}(CH_3)_2N(CH_2)_3Si(OCH_3)_3]^+Cl^-$, $[C_{16}H_{33}(CH_3)_2N(CH_2)_3Si(OCH_2CH_3)_3]^+Cl^-$, $[C_{16}H_{33}(CH_3)_2N(CH_2)_3SiCH_3(OCH_3)_2]^+Cl^-$, $[C_{16}H_{33}(CH_3)_2N(CH_2)_3SiCH_3(OCH_2CH_3)_3]^+Cl^-$, $[C_{18}H_{37}(CH_3)_2N(CH_2)_3Si(OCH_3)_3]^+Cl^-$, $[C_{18}H_{37}(CH_3)_2N(CH_2)_3Si(OCH_2CH_3)_3]^+Cl^-$, $[C_{18}H_{37}(CH_3)_2N(CH_2)_3SiCH_3(OCH_3)_2]^+Cl^-$, and $[C_{18}H_{37}(CH_3)_2N(CH_2)_3SiCH_3(OCH_2CH_3)_3]^+Cl^-$.

The addition of component (G) can impart antibacterial and antifungal properties. The amount of component (G) blended is preferably 0.05 to 10 parts, especially 0.1 to 5 parts by weight per 100 parts by weight of aqueous water repellent solids (co-hydrolytic condensate of components (A) and (B)). Too small amounts may impart insufficient antibacterial and antifungal properties whereas too large amounts may adversely affect the storage stability of the aqueous water repellent.

On the other hand, the boron-containing compound (H) is preferably a boric acid compound. Examples include orthoborates such as $InBO_3$ and $Mg_3(BO_3)_2$; diborates such as $Mg_2B_2O_5$ and $Co_2B_2O_5$; metaborates such as $NaBO_2$, $KBO_2$, $LiBO_2$ and $Ca(BO_2)_2$; tetraborates such as $Na_2B_4O_7$; and pentaborates such as $KB_5O_8$. Boric acids such as orthoboric acid ($H_3BO_3$), metaboric acid ($HBO_2$) and tetraboric acid ($H_2B_4O_7$) are also useful as well as borax ($Na_2B_4O_7.10H_2O$).

The addition of component (H) can impart termite-proof property. The amount of component (H) blended is preferably 0.1 to 10 parts, especially 2 to 8 parts by weight per 100 parts by weight of aqueous water repellent solids (co-hydrolytic condensate of components (A) and (B)). Too small amounts may impart insufficient termite-proof property whereas too large amounts may adversely affect the storage stability of the aqueous water repellent.

When wood is treated with the aqueous water repellent [I], the repellent may be diluted with water to a concentration of 0.5 to 50%, preferably 1 to 10% by weight, prior to use. With thin dilution below 0.5% by weight, the repellent may fail to exert its performance to a full extent and must be applied in a larger amount, which may require a longer time for drying. A concentration of more than 50% by weight indicates insufficient dilution and gives too high a viscosity to impregnate wood therewith, sometimes leaving coating marks and causing discoloration.

When the aqueous water repellent [I] is diluted with water to form an aqueous solution, the aqueous solution should preferably be at pH 7 to 3, especially pH 6 to 4. If the aqueous solution is above pH 7 or alkaline, the solution can damage cellulose moieties of wood. If the aqueous solution is below pH 3 or strongly acidic, there arise problems that wood is damaged and equipment used for treatment are corroded.

Upon dilution of the aqueous water repellent [I] with water, various subordinate additives may be added. Such additives include preservatives, antifungal agents, termite controlling agents, flavors, colorants, carboxymethyl cellulose, polyvinyl alcohol (PVA), water-soluble acrylic resins, SBR latex, and colloidal silica. Such optional component may be added in a conventional amount as long as it does not compromise the benefits of the invention.

When it is desired to cause the aqueous water repellent [I] to penetrate deeply into the wood, a surfactant may be added to the repellent to enhance its penetrability.

The surfactant used herein is not critical and any of well-known nonionic, cationic and anionic surfactants is useful. Examples include nonionic surfactants such as polyoxyethylene alkyl ethers, polyoxyethylene alkyl phenyl ethers, polyoxyethylene carboxylate, sorbitan fatty acid esters, polyoxyethylene sorbitan fatty acid esters, and polyether-modified silicones; cationic surfactants such as alkyltrimethylammonium chloride and alkylbenzylammonium chloride; anionic surfactants such as alkyl or alkylallyl sulfates, alkyl or alkylallyl sulfonates, and dialkyl sulfosuccinates; and ampholytic surfactants such as amino acid and betaine type surfactants. Of these, polyether-modified silicone surfactants are preferred.

An appropriate amount of the surfactant added is 0.01 to 5% by weight, more preferably 0.2 to 2.5% by weight based on the solids of the aqueous water repellent. With less than 0.01% by weight of the surfactant, substantially no addition effect is achieved. More than 5% by weight of the surfactant may sometimes adversely affect water absorption inhibition and water repellency.

Rather than previously adding the surfactant to the aqueous water repellent, wood may be pretreated with a dilution of the surfactant prior to the treatment with the aqueous water repellent. In this case, the surfactant is diluted with water or an organic solvent to a concentration of 0.01 to 5%, especially 0.1 to 2% by weight, the wood is pretreated with this surfactant dilution by roller coating, brush coating or spraying or even by dipping, and the wood is then treated with the aqueous water repellent. This procedure ensures that the repellent penetrates deeply into the wood.

In applying a water dilution of the aqueous water repellent to the wood, a roller, brush, spray or the like may be used. In some cases, dipping may be used. Application may be done under atmospheric pressure or reduced pressure. The subsequent drying step may be holding at room temperature, drying in the sun, or heat drying.

Next, the emulsion water repellent [II] used in the modification of wood according to the inventive method is described. Component (C) used in the preparation of the emulsion water repellent [II] is an organodisiloxane having the general formula (3):

$$R^7_3Si—O—SiR^7_3 \quad (3)$$

wherein $R^7$ is each independently a $C_{1-10}$ alkyl group. It serves for trialkylsiloxy end-capping. $R^7$ in formula (3) is preferably selected from among methyl, ethyl, n-propyl, iso-propyl, n-butyl, iso-butyl and t-butyl groups, and straight or branched pentyl, hexyl, heptyl, octyl, nonyl and decyl groups, with the methyl being most preferred.

Component (D) used in the preparation of the emulsion water repellent [II] is a tetraalkoxysilane of the general formula (4):

$$Si(OR^7)_4 \quad (4)$$

wherein $R^7$ is as defined above, or a partial hydrolytic condensate thereof. It serves as a source for $SiO_{4/2}$ unit structure. $R^7$ in formula (4) may be any of the above-exemplified groups. Of these, a group selected from methyl, ethyl, n-propyl and iso-propyl is preferred from the polymerization reactivity standpoint, with the methyl and ethyl being most preferred.

Of the tetraalkoxysilane and its partial hydrolytic condensate, the latter is preferred because the quantity of alcohol by-product is reduced during the polymerization of components (C) and (D).

Components (C) and (D) are used in such a proportion that the molar ratio of trialkylsiloxy units ($R^7_3SiO_{0.5}$) in component (C) to tetrafunctional units ($SiO_{4/2}$) in component (D) may fall in a range of 0.5/1 to 2.0/1, preferably in a range of 0.7/1 to 1.5/1. No uniform emulsion is obtainable outside the range because gelation occurs at too low a molar ratio and phase separation occurs at too high a molar ratio.

Component (E) is a surfactant which assists in uniformly dispersing components (C) and (D) in water. Suitable surfactants include, but are not limited to, anionic surfactants such as alkyl sulfates, alkylbenzene sulfonates, and alkyl phosphates; nonionic surfactants such as polyoxyethylene alkyl ethers, polyoxyethylene alkyl phenyl ethers, and polyoxyethylene fatty acid esters; cationic surfactants such as quaternary ammonium salts and alkylamine acetates; and ampholytic surfactants such as alkylbetaines and alkylimidazolines. They may be used alone or in admixture of any. Of these, anionic surfactants are preferred for polymerization reaction and stability. Component (E) is generally used in an amount of 0.1 to 20 parts by weight, preferably 0.3 to 10 parts by weight per 100 parts by weight of components (C) and (D) combined.

Water as component (F) is generally used in an amount of 50 to 2,000 parts by weight, preferably 100 to 1,000 parts by weight per 100 parts by weight of components (C) and (D) combined.

For promoting the polymerization of components (C) and (D), a catalyst may be used in a catalytic amount. Suitable catalysts include acidic substances such as sulfuric acid, hydrochloric acid, phosphoric acid, acetic acid, formic acid, lactic acid, and trifluoroacetic acid, and alkaline substances such as potassium hydroxide, sodium hydroxide and ammonia. The polymerization catalyst need not be used when acidic substances such as alkyl sulfates, alkylbenzenesulfonic acids or alkylphosphoric acids are used as the surfactant (E).

An appropriate reaction process involves heating an aqueous solution containing components (E) and (F) and optionally a polymerization catalyst at a temperature of 30 to 90° C., adding dropwise components (C) and (D) to the aqueous solution, with stirring, and performing polymerization at 30 to 90° C., preferably for 1 to 100 hours. Thereafter, the acidic catalyst or acidic component (E), if used, is neutralized with an alkaline substance such as sodium carbonate, ammonia, sodium hydroxide or triethanolamine; or the alkaline catalyst, if used, is neutralized with an acidic substance such as acetic acid, formic acid, phosphoric acid or hydrochloric acid. If the temperature is below 30° C., the organodisiloxane (C) does not participate in the reaction effectively, failing to produce a uniform emulsion. If the temperature is above 90° C., the emulsion becomes unstable. The preferred temperature range is from 40° C. to 85° C.

In an alternative process, component (D) is previously polymerized in components (E) and (F) and optionally a polymerization catalyst at a temperature of 30 to 90° C., component (C) is added dropwise thereto, and polymerization performed at 30 to 90° C.

In the emulsion preparation process, it is acceptable to use the dialkoxydialkylsilane, trialkoxyalkylsilane and partial hydrolytic condensates thereof in combination. With this process, the emulsion water repellent [II] useful in the present invention is prepared in an economical and simple manner using ordinary starting materials, and without using an organic solvent.

When wood is treated with the emulsion water repellent [II], the repellent may be diluted with water to a concentration of 0.5 to 20%, preferably 1 to 10% by weight, prior to use. With thin dilution below 0.5% by weight, the repellent may fail to exert its performance to a full extent and must be applied in a larger amount, which may require a longer time for drying. A concentration of more than 20% by weight gives too high a viscosity to impregnate wood therewith, sometimes leaving coating marks and increasing the cost.

In applying the emulsion water repellent [II] to the wood, a roller, brush, spray or the like may be used. In some cases, dipping may be used. Application may be done under atmospheric pressure or reduced pressure. The subsequent drying step may be holding at room temperature, drying in the sun, or heat drying.

With respect to the order of treatment with the aqueous water repellent [I] and the emulsion water repellent [II], treatment with [I] is followed by treatment with [II], or vice verse. The preferred order is from treatment with [I] to treatment with [II].

The aqueous water repellent [I] with which a wood substrate is impregnated in the above-described manner undergoes hydrolytic reaction and condensation reaction to form a tenacious, water-absorption-inhibiting layer. When treatment with the emulsion water repellent [II] is subsequently carried out, a tenacious water repellent layer is additionally formed through adsorption. This will be effective for overcoming the problems of blister, rotting and mildewing of wood caused by water.

The wood modifying method of the invention is generally applicable to wood and advantageously used in the modification of plywood and veneer laminates. Specifically, a plywood or veneer laminate is impregnated and treated from its front and back surfaces with the water repellents [I] and [II] whereby the regions of the plywood or veneer laminate extending from the front and back surfaces to the first adhesive layers (usually 0.5 to 10 mm in a thickness direction) are selectively impregnated by utilizing the fact that planar adhesive layers characteristic of the plywood and veneer laminate prevent the solution from easily penetrating beyond the adhesive layers when the solution is applied to the front and back surfaces. In this way, the desired performance is obtained while reducing the amount of repellent impregnated per product volume. In the process, the same solution is preferably applied to cut sections and/or machined sections of the plywood or veneer laminate for impregnation as well.

More particularly, the tree species of wooden raw material from which the plywood or veneer laminate is made is not critical, and the type of adhesive resin used in the preparation of plywood and/or veneer laminate is not critical.

When the water repellent [I] or [II] is applied to front and back surfaces and cut sections or machined sections of plywood or veneer laminate for impregnation, the temperature of plywood or veneer laminate may be room temperature. However, it is desired that a temperature on the order of 40 to 80° C. be maintained not only on the surfaces, but also in the interior of plywood or veneer laminate in order to ensure penetration. Inversely, the aqueous water repellent heated at a temperature of 40 to 80° C. may be used while keeping the plywood or veneer laminate at room temperature. Since the water content of plywood or veneer laminate must fall in the range clearing a level of up to 14% as prescribed by the Japanese Agricultural and Forestry Standards or any official regulation level, the water repellents are applied in such amounts as to provide a water content within that range.

With respect to the coating technique, coating of the aqueous water repellent [I] by means of a roll coater or sponge roll is desired in a sense of managing the coating weight, while spray coating and coating by vat immersion are also acceptable. To increase the immersion amount, the coating step may be repeated two or more times. In treatment with the emulsion water repellent [II], coating by means of a roll coater or sponge roll and vat immersion are acceptable, although spray coating is recommended. If the emulsion water repellent is applied in excessive amounts as often found in vat immersion, blocking can occur. In this regard the spray coating technique is preferred because the coating weight is controllable.

Referring to aging, the invention generally requires 12 to 200 hours for aging after coating. Aging is desirably conducted at an air temperature of 10 to 35° C. in fully ventilated conditions.

The preparation method described above ensures that the plywood or veneer laminate which is termite-proof, rot-proof, mildew-proof, water resistant, moisture resistant and dimensional stable so that it may be used as main structural members or building interior members be easily prepared without detracting from the texture inherent to wood and without incurring blocking due to deposition.

EXAMPLE

Examples of the invention are given below together with Comparative Examples by way of illustration and not by way of limitation. All parts are by weight. The term "M unit" designates $(CH_3)_3SiO_{0.5}$ unit and "Q unit" designates $SiO_{4/2}$ unit. NMR is nuclear magnetic resonance and GPC is gel permeation chromatography.

Synthesis Example 1

A 500-ml four-necked flask equipped with a condenser, thermometer and dropping funnel was charged with 85 g (0.37 mol calculated as dimer) of a methyltrimethoxysilane oligomer, 154 g of methanol and 5.1 g of acetic acid. With stirring, 6.8 g (0.37 mol) of water was added to the charge, which was stirred for 2 hours at 25° C. Then 8.9 g (0.04 mol) of N-(2-aminoethyl)-3-aminopropyltrimethoxysilane was added dropwise. The reaction solution was heated to the reflux temperature of methanol and reaction effected for one hour. With an ester adapter attached, methanol was distilled off until the internal temperature reached 110° C. There was obtained 81 g of a pale yellow clear solution having a viscosity of 71 $mm^2/s$ (weight average molecular weight 1100). The content of residual methanol in the solution was 5% by weight. This is designated Aqueous Repellent 1.

Synthesis Example 2

Reaction was carried out as in Synthesis Example 1 except that the amount of N-(2-aminoethyl)-3-aminopropyltrimethoxysilane was changed to 17.8 g (0.08 mol). There was obtained 86 g of a pale yellow clear solution having a viscosity of 116 $mm^2/s$ (weight average molecular weight 1200). The content of residual methanol in the solution was 5% by weight. This is designated Aqueous Repellent 2.

Synthesis Example 3

A 500-ml four-necked flask equipped with a condenser, thermometer and dropping funnel was charged with 50.3 g (0.37 mol) of methyltrimethoxysilane, 124 g of methanol and 5.1 g of acetic acid. With stirring, 6.8 g (0.37 mol) of water was added to the charge, which was stirred for 2 hours at 25° C. Then 8.9 g (0.04 mol) of N-(2-aminoethyl)-3-aminopropyl-trimethoxysilane was added dropwise. The reaction solution was heated to the reflux temperature of methanol and reaction effected for one hour. With an ester adapter attached, methanol was distilled off until the internal temperature reached 110° C. There was obtained 43 g of a pale yellow clear solution having a viscosity of 65 $mm^2/s$ (weight average molecular weight 1000). The content of residual methanol in the solution was 6% by weight. This is designated Aqueous Repellent 3.

Synthesis Example 4

A 500-ml four-necked flask equipped with a condenser, thermometer and dropping funnel was charged with 60.6 g (0.37 mol) of propyltrimethoxysilane, 144 g of methanol and 5.1 g of acetic acid. With stirring, 6.8 g (0.37 mol) of water was added to the charge, which was stirred for 2 hours at 25° C. Then 8.9 g (0.04 mol) of N-(2-aminoethyl)-3-aminopropyl-trimethoxysilane was added dropwise. The reaction solution was heated to the reflux temperature of methanol and reaction effected for one hour. With an ester adapter attached, methanol was distilled off until the internal temperature reached 110° C. There was obtained 51 g of a pale yellow clear solution having a viscosity of 65 $mm^2/s$ (weight average molecular weight 800). The content of residual methanol in the solution was 7% by weight. This is designated Aqueous Repellent 4.

Synthesis Example 5

Reaction was carried out as in Synthesis Example 1 except that 17.7 g (0.08 mol) of 3-aminopropyltriethoxysilane was used instead of N-(2-aminoethyl)-3-aminopropyltrimethoxy-silane. There was obtained 90 g of a pale yellow clear solution having a viscosity of 220 $mm^2/s$ (weight average molecular weight 1300). The content of residual methanol in the solution was 5% by weight. This is designated Aqueous Repellent 5.

Synthesis Example 6

A composition obtained by mixing 10 parts of Aqueous Repellent 1 synthesized in Synthesis Example 1 and 0.5 part of 3-(trimethoxysilyl)propyloctadecyldimethylammonium with 89.5 parts of water and dissolving therein is designated Aqueous Repellent 6.

Synthesis Example 7

A composition obtained by mixing 10 parts of Aqueous Repellent 1 synthesized in Synthesis Example 1 and 2 parts of boric acid with 88 parts of water and dissolving therein is designated Aqueous Repellent 7.

Synthesis Example 8

A composition obtained by mixing 10 parts of Aqueous Repellent 1 synthesized in Synthesis Example 1, 0.5 part of 3-(trimethoxysilyl)propyloctadecyldimethylammonium and 2 parts of boric acid with 87.5 parts of water and dissolving therein is designated Aqueous Repellent 8.

Synthesis Example 9

A 2-liter glass agitator vessel equipped with a thermometer was charged with 4 g of dodecylbenzenesulfonic acid and 738 g of water and heated at 50° C. A mixture of 100 g of hexamethyldisiloxane and 145 g of a partial hydrolytic condensate of tetramethoxysilane (Methyl Silicate 51 by Colcoat Co., Ltd., $SiO_{4/2}$ content 51 wt %) (M unit/Q unit molar ratio as charged=1.0) was added dropwise over 2 hours, and the solution agitated at 50° C. for 6 hours for polymerization. The reaction solution was neutralized with 13 g of 3% aqueous ammonia, yielding a bluish white translucent emulsion. It had pH 8.8 and a nonvolatile content of 17.2 wt %. The nonvolatile matter had a M unit/Q unit molar ratio of about 0.95 as analyzed by NMR and an average molecular weight of about 3,000 as measured by GPC. This is designated Emulsion Repellent 1.

Synthesis Example 10

The reactor used in Synthesis Example 9 was charged with 10 g of dodecylbenzenesulfonic acid and 745 g of water and heated at 50° C. 145 g of a partial hydrolytic condensate of tetramethoxysilane (Methyl Silicate 51 by Colcoat Co., Ltd., $SiO_{4/2}$ content 51 wt %) was added, and the solution agitated at 50° C. for 2 hours for polymerization. Then 100 g of hexamethyldisiloxane was added dropwise over one hour, and the solution agitated at 50° C. for 3 hours for polymerization. The reaction solution was neutralized with 24 g of a 10% aqueous sodium carbonate solution, yielding a substantially colorless clear emulsion. It had pH 6.4 and a nonvolatile content of 17.2 wt %. The nonvolatile matter had a M unit/Q unit molar ratio of about 0.95 as analyzed by NMR and an average molecular weight of about 4,000 as measured by GPC. This is designated Emulsion Repellent 2.

Synthesis Example 11

The reactor used in Synthesis Example 9 was charged with 10 g of dodecylbenzenesulfonic acid and 705 g of water and heated at 50° C. A mixture of 100 g of hexamethyldisiloxane and 185 g of tetramethoxysilane (M unit/Q unit molar ratio as charged=1.0) was added dropwise over 2 hours, and the solution agitated at 50° C. for 6 hours for polymerization. The reaction solution was neutralized with 24 g of a 10% aqueous sodium carbonate solution, yielding a bluish white translucent emulsion. It had pH 6.4 and a nonvolatile content of 17.9 wt %. The nonvolatile matter had a M unit/Q unit molar ratio of about 0.95 as analyzed by NMR and an average molecular weight of about 3,000 as measured by GPC. This is designated Emulsion Repellent 3.

Synthesis Example 12

The reactor used in Synthesis Example 9 was charged with 4 g of dodecylbenzenesulfonic acid and 758 g of water and heated at 50° C. A mixture of 80 g of hexamethyldisiloxane and 145 g of a partial hydrolytic condensate of tetramethoxysilane (Methyl Silicate 51 by Colcoat Co., Ltd., $SiO_{4/2}$ content 51 wt %) (M unit/Q unit molar ratio as charged=0.8) was added dropwise over 2 hours, and the solution agitated at 50° C. for 6 hours for polymerization. The reaction solution was neutralized with 13 g of 3% aqueous ammonia, yielding a substantially colorless clear emulsion. It had pH 8.5 and a nonvolatile content of 15.0 wt %. The nonvolatile matter had a M unit/Q unit molar ratio of about 0.76 as analyzed by NMR and an average molecular weight of about 3,500 as measured by GPC. This is designated Emulsion Repellent 4.

Synthesis Example 13

The reactor used in Synthesis Example 9 was charged with 4 g of dodecylbenzenesulfonic acid and 786 g of water and heated at 50° C. A mixture of 150 g of hexamethyldisiloxane and 145 g of a partial hydrolytic condensate of tetramethoxysilane (Methyl Silicate 51 by Colcoat Co., Ltd., $SiO_{4/2}$ content 51 wt %) (M unit/Q unit molar ratio as charged=1.5) was added dropwise over 2 hours, and the solution agitated at 50° C. for 6 hours for polymerization. The reaction solution was neutralized with 13 g of 3% aqueous ammonia, yielding a bluish white emulsion. It had pH 8.9 and a nonvolatile content of 21.8 wt %. The nonvolatile matter had a M unit/Q unit molar ratio of about 1.4 as analyzed by NMR and an average molecular weight of about 2,500 as measured by GPC. This is designated Emulsion Repellent 5.

Synthesis Example 14

A 500-ml four-necked flask equipped with an aspirator and thermometer was charged with 136 g (1.0 mol) of methyltrimethoxysilane, 222.0 g (1.0 mol) of N-(2-aminoethyl)-3-aminopropyltrimethoxysilane and 43.2 g (2.4 mol) of water. With heating and stirring, stripping was carried out through the aspirator until the internal temperature reached 60° C. There was obtained a pale yellow clear solution (weight average molecular weight 900). The content of residual methanol in the solution was 1% by weight. This is designated Aqueous Repellent 9.

Synthesis Example 15

A mixture of 10.5 g (0.04 mol) of decyltrimethoxysilane, 8.8 g of methanol, 0.8 g of acetic acid and 2.2 g (0.12 mol) of water was stirred for one hour at 25° C., yielding a clear solution.

A 500-ml four-necked flask equipped with a condenser, thermometer and dropping funnel was charged with 85 g (0.37 mol calculated as dimer) of a methyltrimethoxysilane oligomer and 170 g of methanol. With stirring, the hydrolyzate of decyltrimethoxysilane obtained above was added dropwise to the charge, which was stirred for one hour at 25° C. Then 5.1 g of acetic acid and 6.7 g (0.37 mol) of water were added to the solution, which was stirred for a further one hour at 25° C. Then 17.8 g (0.08 mol) of N-(2-aminoethyl)-3-aminopropyltrimethoxysilane was added dropwise. The reaction solution was heated to the reflux temperature of methanol and reaction effected for one hour. With an ester adapter attached, methanol was distilled off until the internal temperature reached 110° C. There was obtained a pale yellow clear solution (weight average molecular weight 1300). The content of residual methanol in the solution was 8% by weight. This is designated Aqueous Repellent 10.

Synthesis Example 16

The reactor used in Synthesis Example 9 was charged with 4 g of dodecylbenzenesulfonic acid and 798 g of water and heated at 50° C. A mixture of 40 g of hexamethyldisiloxane and 145 g of a partial hydrolytic condensate of tetramethoxysilane (Methyl Silicate 51 by Colcoat Co., Ltd., $SiO_{4/2}$ content 51 wt %) (M unit/Q unit molar ratio as charged=0.4) was added dropwise over 2 hours, and the solution agitated at 50° C. for 6 hours for polymerization. The reaction solution was neutralized with 13 g of 3% aqueous ammonia. The solution gelled, failing to yield a uniform emulsion.

Synthesis Example 17

The reactor used in Synthesis Example 9 was charged with 4 g of dodecylbenzenesulfonic acid and 628 g of water and heated at 50° C. A mixture of 210 g of hexamethyldisiloxane and 145 g of a partial hydrolytic condensate of tetramethoxysilane (Methyl Silicate 51 by Colcoat Co., Ltd., $SiO_{4/2}$ content 51 wt %) (M unit/Q unit molar ratio as charged=2.1) was added dropwise over 2 hours, and the solution agitated at 50° C. for 6 hours for polymerization. After agitation was interrupted, the reaction solution separated into two phases, failing to yield a uniform emulsion.

Example 1

Aqueous Repellents 1 to 5, 9, 10 obtained in Synthesis Examples 1 to 5, 14, 15 were diluted to 2% aqueous solutions, Agents I-1 to I-5, I-9, I-10. Aqueous Repellents 6, 7, 8 obtained in Synthesis Examples 6, 7, 8 were diluted to 2% aqueous solutions, Agents I-6, I-7, I-8. Emulsion Repellents 1 to 5 obtained in Synthesis Examples 9 to 13 were diluted to 2% aqueous solutions, Agents II-1 to II-5.

Wood pieces were dipped and aged in any Agent I at room temperature for 10 minutes, then dipped and aged in any Agent II at room temperature for 10 minutes, and thereafter, aged at room temperature for one week, obtaining test samples. They were examined for water absorption inhibition by the test described below.

Separately, wood pieces were dipped and aged in Agent II-1 at room temperature for 10 minutes, then dipped and aged in any of Agents I-1, I-3 and I-5 at room temperature for 10 minutes, and thereafter, aged at room temperature for one week, obtaining test samples. They were also examined for water absorption inhibition.

Water Absorption Inhibition Test

A cedar sample of 50×50×21 mm and a lauan sample of 50×50×21 mm in their entirety were dipped in a treating solution for 24 hours at room temperature and atmospheric pressure. The samples were aged for 7 days at room temperature. The surface of the samples was visually observed for discoloration or yellowing and rated according to the following criterion. Subsequently, the treated samples in their entirety were immersed in city water for 24 hours, after which a percent water absorption was calculated to indicate an ability to inhibit water absorption.

Water absorption (%)=[(weight of wood after water absorption)−(weight of wood before water absorption)]/(weight of wood before water absorption)×100

The results are shown in Table 1.

TABLE 1

| Sample | Treatment | | Water absorption (wt %) | |
|---|---|---|---|---|
| Example | Agent I | Agent II | Cedar | Lauan |
| | 1 | 1 | 5 | 3 |
| | 1 | 2 | 5 | 4 |
| | 1 | 3 | 5 | 4 |
| | 1 | 4 | 5 | 4 |
| | 1 | 5 | 5 | 4 |
| | 2 | 1 | 5 | 4 |
| | 3 | 2 | 5 | 4 |
| | 4 | 1 | 6 | 4 |
| | 5 | 1 | 5 | 3 |
| | 5 | 3 | 5 | 4 |
| | 6 | 3 | 6 | 4 |
| | 7 | 4 | 6 | 5 |
| | 8 | 5 | 6 | 5 |
| | Agent II | Agent I | Cedar | Lauan |
| | 1 | 1 | 9 | 7 |
| | 1 | 3 | 11 | 8 |
| | 1 | 5 | 8 | 8 |
| Comparative Example | Agent I | Agent II | Cedar | Lauan |
| | 9 | 1 | 35 | 8 |
| | 10 | 1 | 21 | 8 |
| | 1 | | 10 | 8 |
| | 5 | | 10 | 9 |
| | | 1 | 33 | 30 |
| | | 3 | 34 | 32 |
| | | 5 | 33 | 29 |
| | — | — | 67 | 55 |

Example 2

To Agents I-1 to I-5, I-9, I-10 (i.e., 2% aqueous solutions of Aqueous Repellents 1 to 5, 9, 10 obtained in Synthesis Examples 1 to 5, 14, 15), 0.5 wt % of KF618 (a polyether-modified silicone surfactant by Shin-Etsu Chemical Co., Ltd.) was added to give Agents I-1' to I-5', I-9', I-10'. To Agents I-6, I-7, I-8 (i.e., 2% aqueous solutions of Aqueous Repellents 6, 7, 8 obtained in Synthesis Examples 6, 7, 8), 0.5 wt % of KF618 was added to give Agents I-6', I-7', I-8'.

Wood pieces were dipped and aged in any of Agents I-1' to I-10' at room temperature for 10 minutes, then dipped and aged in any of Agents II-1 to II-5 (i.e., 2% aqueous solutions of Emulsion Repellents 1 to 5 obtained in Synthesis Examples 9 to 13) at room temperature for 10 minutes, and thereafter, aged at room temperature for one week, obtaining test samples. They were examined for water absorption inhibition as in Example 1. The results are shown in Table 2.

TABLE 2

| | Treatment | | Water absorption (wt %) | |
|---|---|---|---|---|
| Sample | Agent I | Agent II | Cedar | Lauan |
| Example | 1' | 1 | 4 | 2 |
| | 1' | 2 | 4 | 3 |
| | 1' | 3 | 4 | 4 |
| | 1' | 4 | 4 | 3 |
| | 1' | 5 | 4 | 3 |
| | 2' | 1 | 4 | 3 |
| | 3' | 2 | 4 | 3 |
| | 4' | 1 | 5 | 3 |
| | 5' | 1 | 4 | 3 |
| | 5' | 3 | 4 | 3 |
| | 6' | 3 | 5 | 3 |
| | 7' | 4 | 5 | 4 |
| | 8' | 5 | 5 | 4 |
| Comparative | 9' | 1 | 37 | 16 |
| Example | 10' | 1 | 25 | 16 |
| | 1' | | 8 | 6 |
| | 5' | | 8 | 5 |
| | | 1 | 38 | 36 |
| | | 3 | 37 | 38 |
| | | 5 | 36 | 35 |
| | — | — | 67 | 55 |

Example 3

As pretreatment, a wood piece was dipped in a 0.5% aqueous solution of KF618 (a polyether-modified silicone surfactant by Shin-Etsu Chemical Co., Ltd.) for 5 minutes. Thereafter, the wood piece was treated as in Example 1. The results are shown in Table 3.

TABLE 3

| | Treatment | | Water absorption (wt %) | |
|---|---|---|---|---|
| Sample | Agent I | Agent II | Cedar | Cedar |
| Example | 1 | 1 | 4 | 2 |
| | 1 | 2 | 4 | 3 |
| | 1 | 3 | 4 | 4 |
| | 1 | 4 | 4 | 3 |
| | 1 | 5 | 4 | 3 |
| | 2 | 1 | 4 | 3 |
| | 3 | 2 | 4 | 3 |
| | 4 | 1 | 5 | 3 |
| | 5 | 1 | 4 | 3 |
| | 5 | 3 | 4 | 3 |
| | 6 | 3 | 5 | 3 |
| | 7 | 4 | 5 | 4 |
| | 8 | 5 | 5 | 4 |
| Comparative | 9 | 1 | 37 | 17 |
| Example | 10 | 1 | 27 | 19 |
| | 1 | | 9 | 8 |
| | 5 | | 9 | 7 |
| | | 1 | 38 | 36 |
| | | 3 | 37 | 39 |
| | | 5 | 37 | 37 |
| | — | — | 67 | 55 |

Example 4

Wood pieces were wiped and aged in Agents I-6, I-7, I-8 (i.e., 2% aqueous solutions of Aqueous Repellents 6, 7, 8 obtained in Synthesis Examples 6, 7, 8) at room temperature for 2 hours, then dipped and aged in Agent II-1 (i.e., 2% aqueous solutions of Emulsion Repellent 1 obtained in Synthesis Example 9) for 30 minutes, and thereafter, aged at room temperature for one week, obtaining test samples. They were subjected to a wood rotting test and a termite death test as described below. The results are shown in Table 4.

(a) Wood Rotting Test using White and Brown Rot Fungi

For examining antibacterial/antifungal activity, a rotting test was made on inorganic matter-composited wood according to the Japan Wood Preservation Association (JWPA) Standard, No. 3 (1992), Durability Test Method for Wooden Material. After test pieces were dried and sterilized at 60° C. for 48 hours, they were placed on lawns of white rot fungus Coriolus versicolor (L. ex Fr.) Quel (IFO 30340) and brown rot fungus Tyromyces palustris (Berk. et Curk. Murr.) (IFO 303390) which had been fully grown in culture dishes in a glass container. After cultivation in an incubator at room temperature (26° C.) and a relative humidity of 55 to 65% for 8 weeks, the test pieces were taken out, and the fungal cells were wiped off form the surface. The absolute dry weight of the test pieces was determined. A percent weight loss by wood-rot fungus was calculated from the absolute dry weight of the test pieces before the test.

(b) Subterranean Rotting Test

Untreated wood test pieces and wood test pieces which had been treated with the water repellents were subjected to Soxhlet extraction with acetone and water each for 24 hours. A subterranean test of burying the test pieces in non-sterilized soil 17 cm deep from the ground surface was carried out for 9 months. A percent weight loss was calculated from the absolute dry weights of each test piece before and after the burying test, from which the progress of decay was presumed.

(c) Termite Death Test

Two hundred (200) house termite individuals were introduced in each of containers with untreated wood pieces and water repellent-treated wood pieces and left there for 20 days, after which a termite death rate was determined.

TABLE 4

| | Sample Treatment | | Wood rot with fungi (%) | | | | Wood rot by subterranean test (%) | | Termite death rate (%) | |
|---|---|---|---|---|---|---|---|---|---|---|
| | | | Cedar | | Lauan | | | | | |
| | Agent I | Agent II | White rot fungus | Brown rot fungus | White rot fungus | Brown rot fungus | Cedar | Lauan | Cedar | Lauan |
| Examples | 6 | 1 | 0.3 | 0.3 | 0.7 | 0.3 | 1.8 | 2.1 | 47 | 40 |
| | 7 | 1 | 1.9 | 1.0 | 1.6 | 1.2 | 4.6 | 5.1 | 100 | 100 |
| | 8 | 1 | 0.2 | 0.2 | 0.5 | 0.2 | 1.2 | 1.5 | 100 | 100 |
| Comparison | — | — | 3.0 | 3.1 | 4.1 | 4.3 | 25.0 | 29.3 | 23 | 25 |

Example 5

The test piece used was a veneer laminate prepared using Radiata pine from New Zealand as a raw material. The test piece was coated and impregnated with Aqueous Repellent I and Emulsion Repellent II, after which it was measured for water absorption prevention and dimensional stability.

The preparation of the veneer laminate, the coating and impregnation, and the measurement of water absorption prevention and dimensional stability were conducted as follows.

Figure 2:
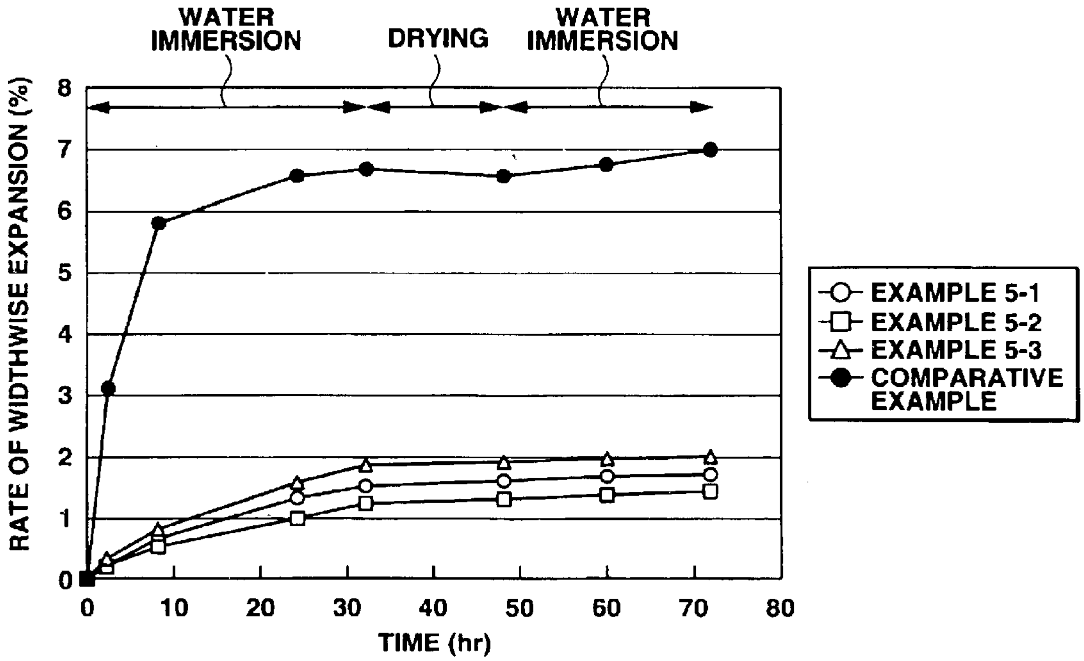
FIG. 2 is a graph showing changes with time of rate of widthwise expansion of samples in Example 5.
Figure 3:
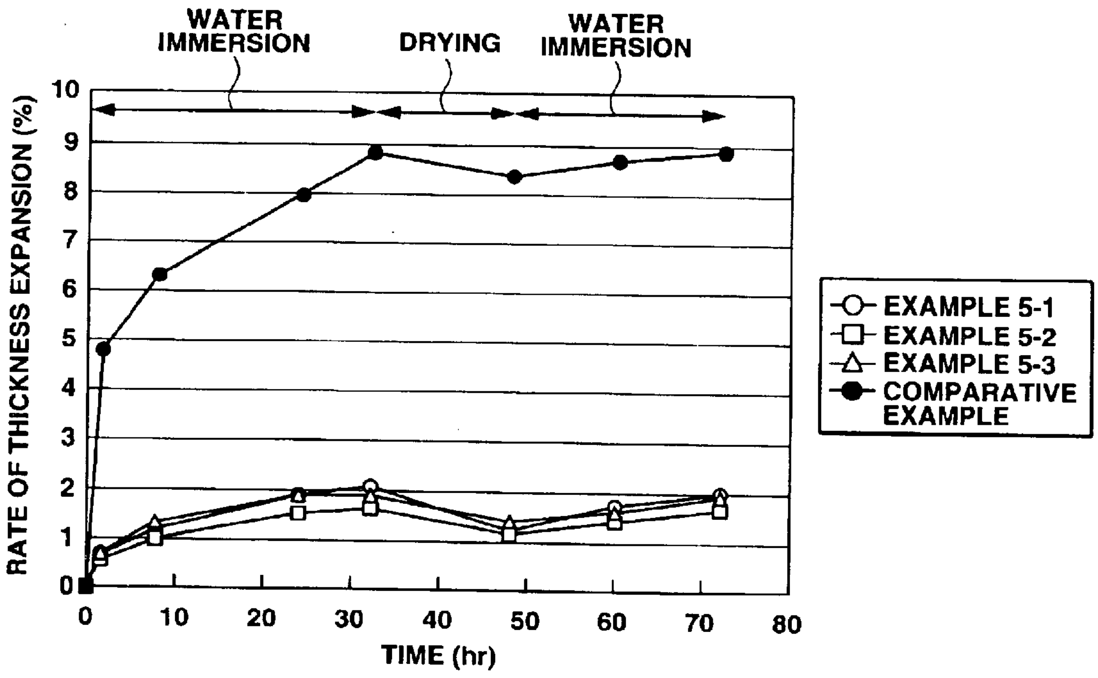
FIG. 3 is a graph showing changes with time of rate of thickness expansion of samples in Example 5.

Using Radiata pine veneers of 3 mm thick, a veneer laminate of 9 plies having a thickness of 27 mm, a width of 300 mm and a fiber direction of 300 mm was prepared in a conventional way. It was aged for 7 days. One laminate was then cut into three pieces having a width of 100 mm and a fiber direction of 300 mm. The test pieces were dried in hot air blow at 105° C. for 2 hours, and then brush coated over all the surfaces (6 sides) with any of Agents I-1, I-3 and I-5 (i.e., 2% aqueous solutions of Aqueous Repellents 1, 3 and 5) for impregnation. The impregnated weight was 100 g/m$^2$. Subsequently, the test pieces were brush coated with Agent II-1 (i.e., 2% aqueous solution of Emulsion Repellent 1) for impregnation. The impregnated weight was 100 g/m$^2$. Then the test pieces were aged at room temperature for a further 10 days, after which they were subjected to the dimensional stability test described below. The results are shown in FIGS. 1 to 3.

FIG. 1 is a graph showing changes with time of percent water absorption. FIG. 2 is a graph showing changes with time of rate of widthwise expansion. FIG. 3 is a graph showing changes with time of rate of thickness expansion.

Example 5-1

Agent I-1 Treatment Followed by Agent II-1 Treatment

Example 5-2

Agent I-3 Treatment Followed by Agent II-1 Treatment

Example 5-3

Agent I-5 Treatment Followed by Agent II-1 Treatment

Comparative Example

Untreated Sample

Dimensional Stability Test

The veneer laminates modified as above were immersed in water at room temperature for 32 hours, taken out, and dried in hot air blow at 40° C. for 16 hours. They were further immersed in water at room temperature for 24 hours. During the process, the weight, thickness and width of the test pieces were measured at suitable time intervals, from which the percent water absorption and rates of thickness and width expansion were computed, obtaining the results shown in FIGS. 1 to 3. It is noted that the percent water absorption and rates of thickness and width expansion were calculated according to the following equations.

$$\text{Water absorption }(\%)=[(W_t-W_0)/W_0]\times 100$$

$W_t$: weight (g) of test piece after lapse time t
$W_0$: weight (g) of test piece before the test start $$\text{Rate of thickness expansion }(\%)=[(T_t-T_0)/T_0]\times 100$$

$T_t$: thickness (mm) of test piece after lapse time t
$T_0$: thickness (mm) of test piece before the test start $$\text{Rate of width expansion }(\%)=[(WI_t-WI_0)/WI_0]\times 100$$

$WI_t$: width (mm) of test piece after lapse time t
$WI_0$: width (mm) of test piece before the test start There has been described a method for preparing modified wood, which can impart high water repellency, low water absorption and high dimensional stability to wood by performing two stages of treatment with an aqueous water repellent and an emulsion water repellent. With this method, wood panels can be endowed with termite-proof, rot-proof, mildew-proof, water resistant, moisture resistant or dimensional stable properties in accordance with the desired performance at a particular service site, without detracting from the advantages of wood panels including porosity, low specific gravity, and ease of working (machinability, nail retention, adhesion, paintability, etc.). Further, the method for preparing modified plywood or modified veneer laminates according to the invention provides for process management in a manufacturing factory, which enables to carry out impregnating operation efficiently while preventing the manufacturing cost from increasing.

Japanese Patent Application No. 2002-280908 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method for preparing modified wood comprising treating wood with an aqueous water repellent [I] and treating the same with an emulsion water repellent [II], said aqueous water repellent [I] comprising a product obtained through co-hydrolytic condensation of (A) 100 parts by weight of an organosilicon compound of the general formula (1):

$$(R^1)_a(OR^2)_bSiO_{(4-a-b)/2} \quad (1)$$

wherein $R^1$ is a $C_{1-6}$ alkyl group, $R^2$ is a $C_{1-4}$ alkyl group, a is a positive number of 0.75 to 1.5, b is a positive number of 0.2 to 3, satisfying $0.9<a+b\leqq 4$, and (B) 0.5 to 49 parts by weight of an amino-containing alkoxysilane of the general formula (2):

$$R^3R^4NR^5\text{—}SiR^6_n(OR^2)_{3-n} \quad (2)$$

wherein $R^2$ is as defined above, $R^3$ and $R^4$ are each independently hydrogen or a $C_{1-15}$ alkyl or aminoalkyl group, $R^5$ is a divalent $C_{1-18}$ hydrocarbon group, $R^6$ is a $C_{1-4}$ alkyl group, and n is 0 or 1, or a partial hydrolyzate thereof, in the presence of an organic or inorganic acid, said emulsion water repellent [II] being a trialkylsiloxysilicate emulsion water repellent obtained by polymerizing (C) an organodisiloxane of the general formula (3):

$$R^7_3Si\text{—}O\text{—}SiR^7_3 \quad (3)$$

wherein $R^7$ is each independently a $C_{1-10}$ alkyl group, and (D) at least one of a tetraalkoxysilane of the general formula (4):

$$Si(OR^7)_4 \quad (4)$$

wherein $R^7$ is each independently a $C_{1-10}$ alkyl group, and a partial hydrolytic condensate thereof, in such a proportion that the molar ratio of trialkylsiloxy units: $R^7_3SiO_{0.5}$ in component (C) to tetrafunctional units: $SiO_{4/2}$ in component (D) may fall in a range of 0.5 to 2.0, in an aqueous solution containing (E) a surfactant and (F) water at a temperature of 30 to 90° C.

2. The method of claim 1 wherein in formula (1), $R^1$ is methyl.

3. The method of claim 1 wherein component (A) is a siloxane oligomer.

4. The method of claim 3 wherein component (A) is a siloxane dimer having the formula: $[CH_3(OR^2)_2Si]_2O$ wherein $R^2$ is as defined above.

5. The method of claim 1 wherein the amino-containing alkoxysilane (B) is selected from the group consisting of:

$H_2NCH_2CH_2NHCH_2CH_2CH_2Si(OCH_3)_3$ $H_2NCH_2CH_2NHCH_2CH_2CH_2Si(OCH_2CH_3)_3$

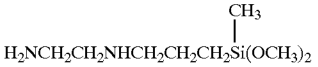

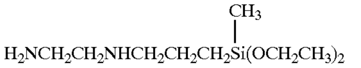

$H_2NCH_2CH_2CH_2Si(OCH_3)_3$ $H_2NCH_2CH_2CH_2Si(OCH_2CH_3)_3$

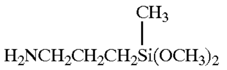 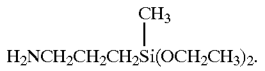

6. The method of claim 1 wherein the co-hydrolytic condensation product of components (A) and (B) has a weight average molecular weight of 500 to 5,000.

7. The method of claim 1 wherein said aqueous water repellent [I] is obtained by hydrolyzing component (A) in the presence of an organic or inorganic acid and an alcohol, reacting the hydrolyzate with component (B), and then removing the alcohol from the reaction system.

8. The method of claim 1 wherein component (D) is a partial hydrolytic condensate of the tetraalkoxysilane of formula (4), and component (E) is an anionic surfactant.

9. The method of claim 1 wherein said aqueous water repellent [I] further comprises an aliphatic quaternary ammonium compound.

10. The method of claim 9 wherein said aliphatic quaternary ammonium compound is a quaternary amino group-containing alkoxysilane of the general formula (5):

$$[(CH_3)_2R^7N(CH_2)_3\text{—}SiR^6_n(OR^2)_{3-n}]^+X^- \quad (5)$$

wherein $R^2$ and $R^6$ are as defined above, $R^7$ is a monovalent $C_{11-22}$ hydrocarbon group, and n is 0 or 1, or a partial hydrolyzate thereof.

11. The method of claim 1 wherein said aqueous water repellent [I] further comprises a boron-containing compound.

12. The method of claim 11 wherein said boron-containing compound is a boric acid.

13. The method of claim 1 wherein said wood is a plywood or veneer laminate.

* * * * *

UNITED STATES PATENT AND TRADEMARK OFFICE

CERTIFICATE OF CORRECTION

PATENT NO. : 6,887,527 B2
DATED : May 3, 2005
INVENTOR(S) : Kazuyuki Matsumura et al.

It is certified that error appears in the above-identified patent and that said Letters Patent is hereby corrected as shown below:

Title page,
Item [75], Inventors, should read -- Kazuyuki Matsumura, Gunma-ken (JP); Akira Yamamoto, Gunma-ken (JP) --.

Signed and Sealed this

Twenty-third Day of August, 2005

JON W. DUDAS
*Director of the United States Patent and Trademark Office*